United States Patent [19]
Satcher et al.

[11] Patent Number: 5,503,107
[45] Date of Patent: Apr. 2, 1996

[54] PET CARRIER

[76] Inventors: Johnny Satcher; Kimberly A. Satcher, both of 45076 Lakeview Dr., Apt. 5203, Macomb Township, Mich. 48044

[21] Appl. No.: 330,664

[22] Filed: Oct. 28, 1994

[51] Int. Cl.[6] ................................................ A01K 31/07
[52] U.S. Cl. ........................................................ 119/19
[58] Field of Search ................... 119/19, 18, 17, 119/15, 165–170

[56]  References Cited

U.S. PATENT DOCUMENTS

| | | | |
|---|---|---|---|
| 3,618,568 | 11/1971 | Breeden | 119/165 X |
| 3,791,347 | 2/1974 | Lovell | 119/19 |
| 3,908,597 | 9/1975 | Taylor | 119/166 |
| 4,030,448 | 6/1977 | Duttall | 119/165 |
| 5,044,317 | 9/1991 | Shean et al. | 119/17 |
| 5,092,270 | 3/1992 | Simons et al. | 119/19 |
| 5,165,366 | 11/1992 | Harvey | 119/165 |
| 5,320,064 | 6/1994 | Selstad | 119/19 X |

*Primary Examiner*—Gene Mancene
*Assistant Examiner*—Thomas Price

[57]  ABSTRACT

A container for manually transporting a pet having a litter box, food container and water container therein and sliding doors accessible from the exterior of the container for selectively closing the litter box, food container and water container to prevent inadvertent spillage. The container may include a single compartment or two detachably connected compartments in order that a litter box compartment may be selectively separated from a food and water compartment. Detachable handles are provided in order that each separate compartment of the dual compartment embodiment may be carried separately or as a unified compartment.

13 Claims, 4 Drawing Sheets

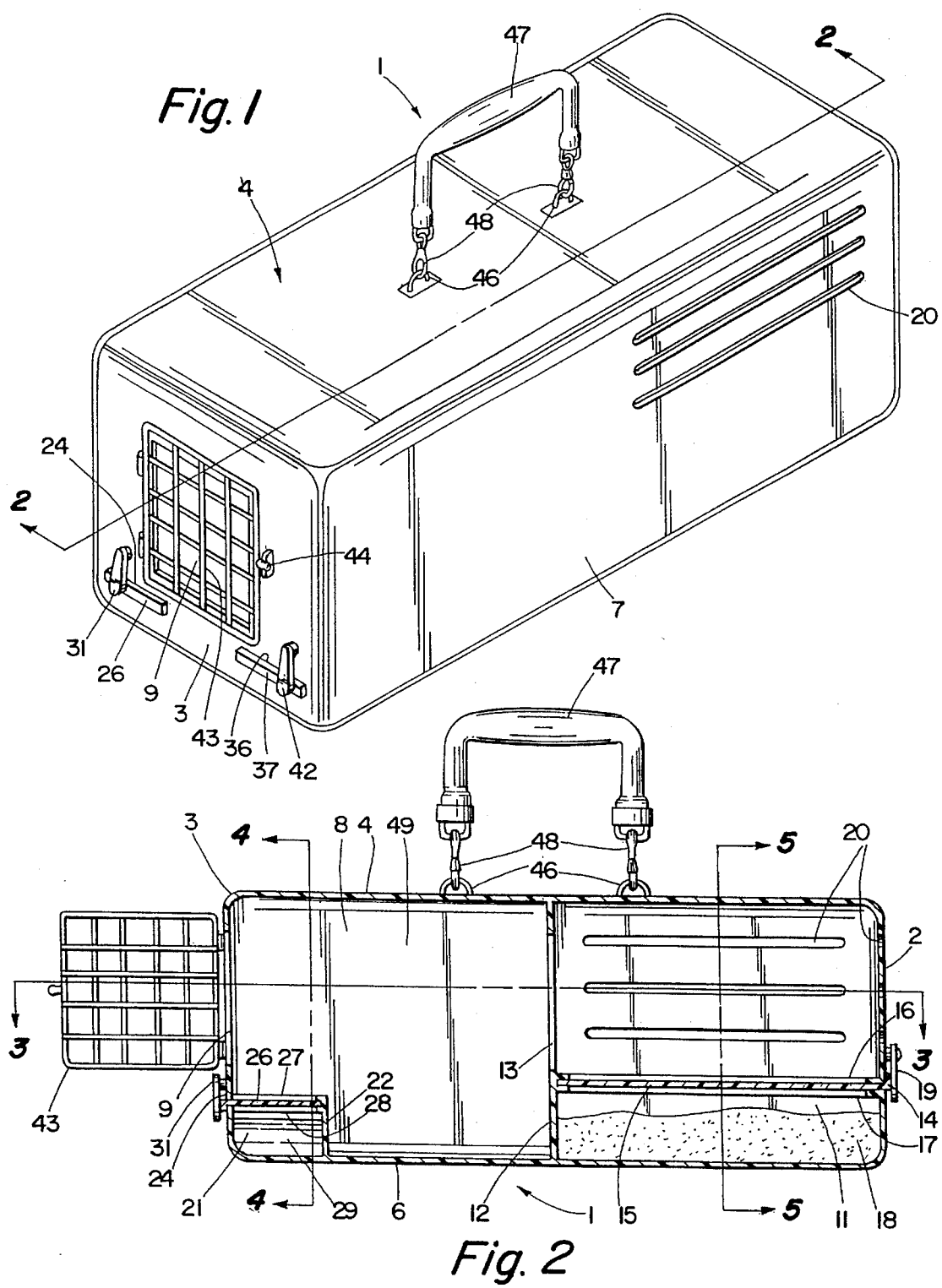

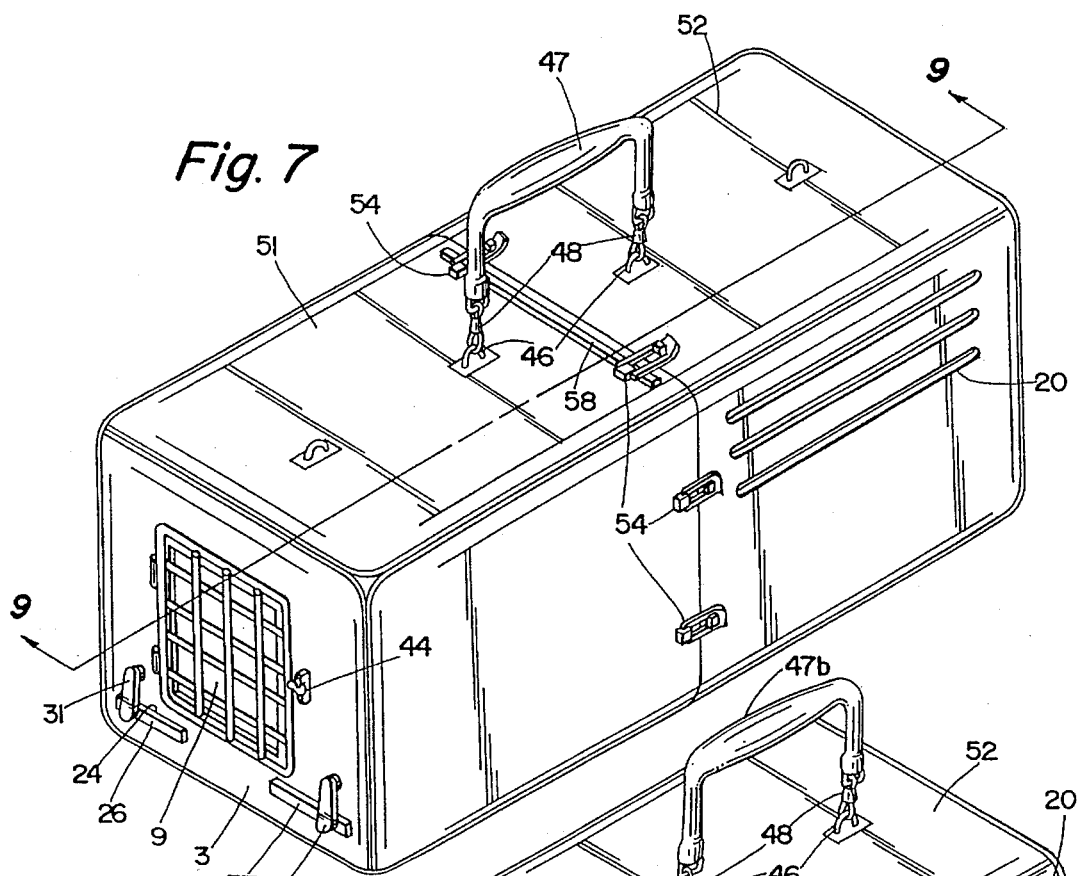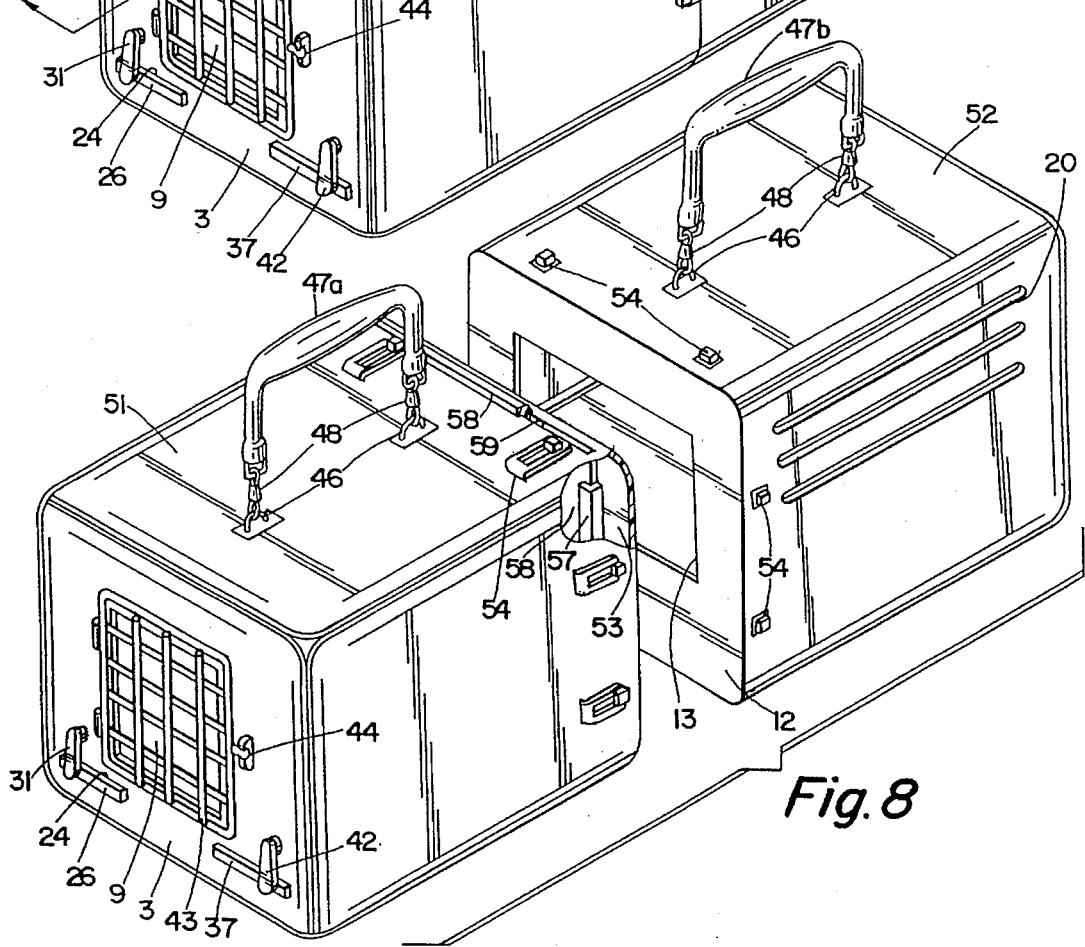

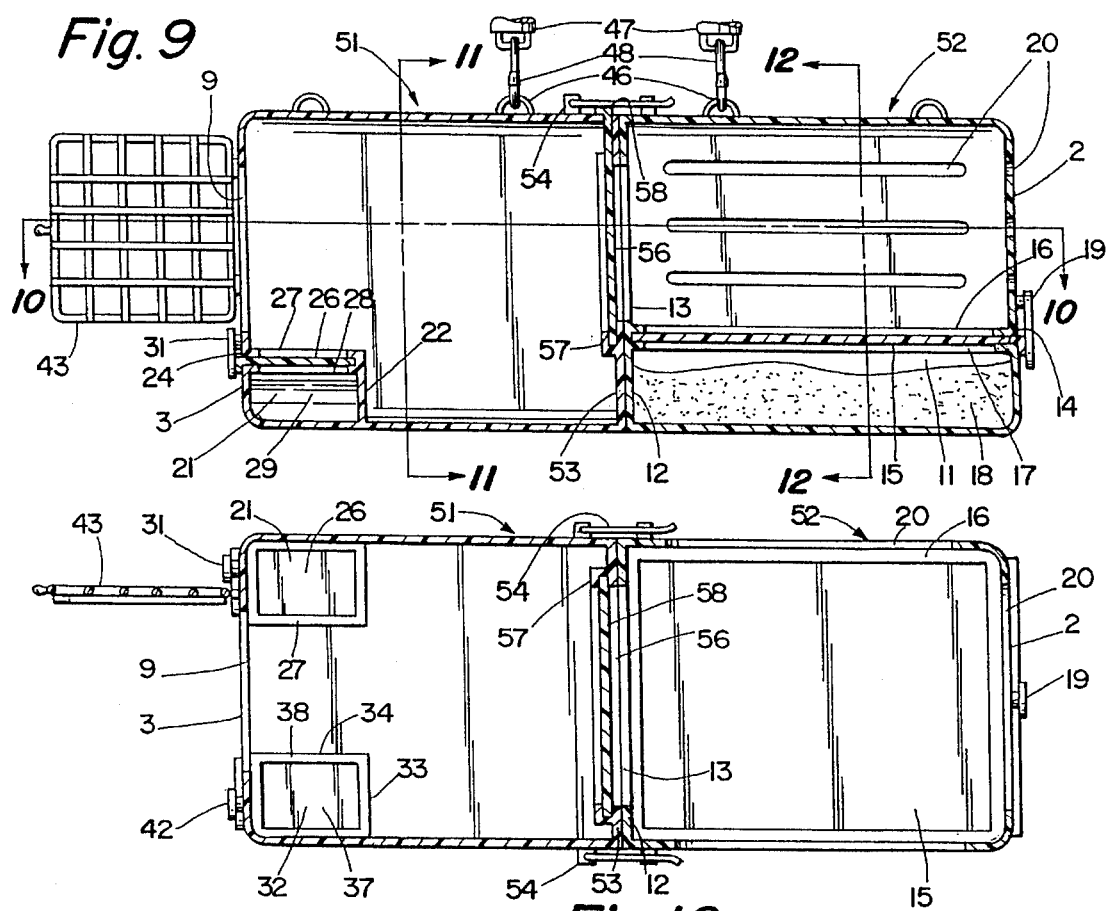
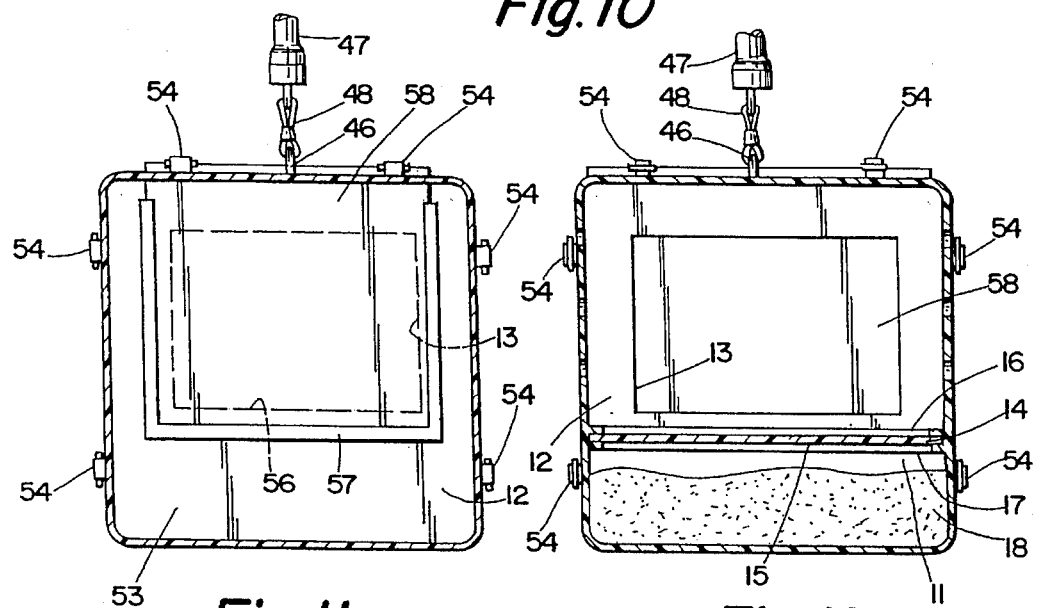

PET CARRIER

FIELD OF THE INVENTION

The present invention relates to hand held containers for transporting small animals. More particularly, the present invention relates to hand held containers for transporting small animals which have a litter container therein and means for selectively opening and closing said litter container. In even greater particularity, the present invention relates to such containers having two selectively detachable compartments.

BACKGROUND OF THE INVENTION

Pet carriers are commonly used to manually transport a pet from one point to another and commonly include a substantially cubicle compartment having a doorway thereon for inserting the pet within the compartment and a handle connected to the top of the compartment for carrying. Such pet carriers are commonly used by pet owners for carrying their pets on trips or as a means for containing the pets when the pets are shipped from one point to another. The pet carriers commonly double as a sleeping quarter for the pet as the owner may contain the pet overnight to prevent the pet from wandering and potentially damaging the home or hotel room in which the owner is occupying.

There are, however, some shortcomings inherent to common pet carriers. During transport, the pet will require food and water and periodically will need to relieve its bodily functions. Food and water can be placed in containers which are placed in the pet carrier compartment. During travel; however, such containers can be overturned either by the transported animal or by the movement of carrier compartment during transport. Further, existing pet carriers do not have a litter box contained therein to allow the pet to relieve his bodily functions when contained within the carrier. If a common litter box was placed within the pet carrier, the quantity of pet litter and feces contained in the litter box would scatter within the carrier compartment during transport.

As a result of the foregoing deficiencies in common pet carriers, the pet owner must carry separate food and water containers which can only be filled with food and water and provided to the pet when the carrier is in a stationary, stable position. As it is unlikely that a traveling pet owner will carry a separate litter box and pet litter, the pet owner must periodically find a suitable outdoor location at which the pet may be released to relieve its bodily functions. As these outdoor locations are not always easy to find, especially when traveling on air or train services, the pet owner and pet can be faced with a serious inconvenience.

SUMMARY OF THE INVENTION

The principal object of the present invention is to provide a pet carrier having a closable litter box formed therein.

In support of the principal object, another object of the present invention is to provide a pet carrier having a closable litter box formed therein, wherein the litter box may be opened and closed from outside the pet carrier.

Another object of the present invention is to provide a pet carrier having closable water and food containers formed therein wherein the food and water containers may be opened and closed from outside the pet carrier.

Yet another object of the present invention is to provide a pet carrier having two compartments whereby the litter box is formed in a first compartment and the food and water containers are formed in a second compartment such that a pet may occupy the second compartment for purposes of eating, drinking and sleeping in relative isolation from the litter box.

These and other objects and advantages of the present invention are accomplished through the use of a substantially rectangular compartment having a litter box formed at one end thereof and a food container and a water container formed on either side of an opening defined by the compartment opposite the litter box. A litter door is slidably received within a slot, defined in the one end and slidably engaged between two rectangular litter box runners connected to the carrier and partially forming the litter box. When inserted within the slot and along the litter box runners, the litter door will seal the litter box, thus selectively isolating a quantity of pet litter contained in the litter box from the interior of the pet carrier. Similar slots, runners and sliding doors are provided adjacent the food and water containers to selectively isolate the food and water contained therein from the interior of the pet carrier. The litter box door, food container and water container door are accessible from the exterior of the pet carrier and, accordingly, are utilized without accessing the interior of the pet container.

A panel, having a portal therethrough, is connected to the interior of the pet carrier to provide relative separation of the litter box from the food and water containers. A handle is connected to the exterior of the pet carrier to facilitate the manual transportation thereof. A gate is pivotally connected to the pet carrier for selectively opening and closing the opening defined thereby.

BRIEF DESCRIPTION OF THE DRAWINGS

Apparatus embodying features of my invention are depicted in the accompanying drawings which form a portion of the disclosure and wherein:

FIG. 1 is a perspective view of a first embodiment of the present invention;

FIG. 2 is a sectional view of the first embodiment of the present invention taken along line 2—2 of FIG. 1;

FIG. 7 is a perspective view of a second embodiment of the present invention showing the living compartment detachably connected to the litter compartment;

FIG. 8 is a perspective view of the second embodiment of the present invention showing the living compartment disconnected from the litter box compartment;

FIG. 9 is a sectional view of the second embodiment of the present invention taken along line 9—9 of FIG. 7;

FIG. 10 is a sectional view of the second embodiment of the present invention taken along line 10—10 of FIG. 9;

FIG. 11 is a sectional view of the second embodiment of the present invention taken along line 11—11 of FIG. 9; and FIG. 12 is a sectional view of the second embodiment of the present invention taken along line 12—12 of FIG. 9.

DESCRIPTION OF PREFERRED EMBODIMENTS

Figure 3:
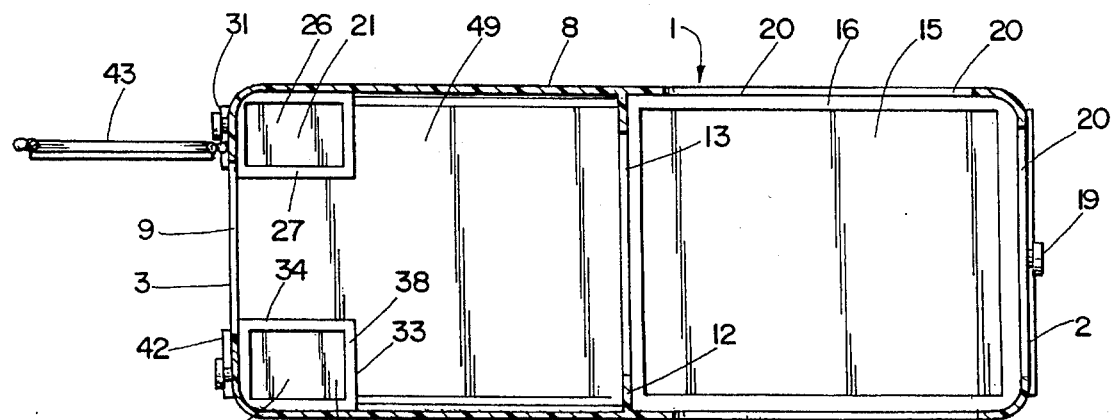
FIG. 3 is a sectional view of the first embodiment of the present invention taken along line 3—3 of FIG. 2 showing the litter door, food container door and water container door inserted within the compartment.

Referring to the drawings for a clearer understanding of the invention, it should be noted in FIGS. 1–6 that a first embodiment of the present invention contemplates the use of a substantially rectangular compartment 1 having a first end panel 2, a second end panel 3, a top panel 4, a bottom panel 6, a left panel 7 and a right panel 8. An opening 9 is defined in the second end panel 3 for inserting a pet (not shown) within the compartment 1.

As shown in FIGS. 2, 3, 4 and 6, a litter box 11 is partially defined by the first end panel 2, the left panel 7, the right panel 8 and a vertical litter box panel 12 connected to the left panel 7, right panel 8, top panel 4 and bottom panel 6 in substantially parallel planar relation to the first end panel 2. A portal 13 is defined by the litter box panel 12 to provide the pet passage to the litter box 11.

A horizontal litter door slot 14 is defined by the first end panel 2 for receiving a litter door 15 therethrough. The litter door 15, when inserted through the litter door slot 14, is slidably received between a rectangular first litter box runner 16, connected to and extending along the left panel 7, the first end panel 2, the right panel 8 and the litter box panel 12, and between a rectangular second litter box runner 17, connected to and extending along the right panel 8, the first end panel 2, the left panel 7 and the litter box panel 12 in parallel relation to the first litter box runner 16. The first and second runners 16 and 17 are connected to the first end panel 2 and spaced on opposite sides of the litter door slot 14.

A quantity of pet litter 18 is contained in the litter box 11 and may be selectively isolated from the interior of the compartment 1 by inserting the litter door 15 through the litter door slot 14, along the left and right pairs of runners 16 and 17 and in abutment with the litter box panel 12. A latch 19 is rotatably connected to the first end panel 2 and may be rotated across the litter door slot 14 to secure the litter door 15 within the compartment 1. As shown in FIGS. 1–4 and 6, ventilation slots 20 are defined by the left panel 7, the right panel 8 and first end panel 2.

As shown in FIGS. 2, 3, 4 and 5, a food container 21 is formed within the compartment 1 adjacent to the opening 9. The food container 21 is partially formed by the second end panel 3, the bottom panel 6 and the right panel 8. The food container 21 is further formed by a first food container panel 22 connected to the bottom panel 6 and left panel 8 in substantially parallel planar relation to the second end panel 3. The food container 21 is further formed by a second food container panel 23 connected to the first food container panel 22, the bottom panel 6 and the second end panel 3 in substantially perpendicular relation to the first food container panel 22.

A horizontal food door slot 24 is defined by the second end panel 3, adjacent to the food container 21, for receiving a food container door 26 therethrough. The food container door 26, when inserted through the food door slot 24, is slidably received between a rectangular first food container runner 27, connected to and extending along the second end panel 3, the right panel 8, the first food container panel 22 and the second food container panel 23 and a rectangular second runner 28, connected to and extending along the first food container panel 22, the right panel 8, the first food container panel 22 and the second food container panel 23 in parallel relation to the first runner 27. The first and second runners 27 and 28 are connected to the second end panel 3 on opposite sides of the food door slot 24.

A quantity of pet food 29 is contained in the food container 21 and may be selectively isolated from the interior of the compartment 1 by inserting the food container door 26 through the food door slot 24, along the first and second runners 27 and 28, and in abutment with the first food container panel 22. A latch 31 is rotatably connected to the second end panel 3 and may be rotated across the food door slot 24 to secure the food container door 26 within the compartment 1.

Figure 4:
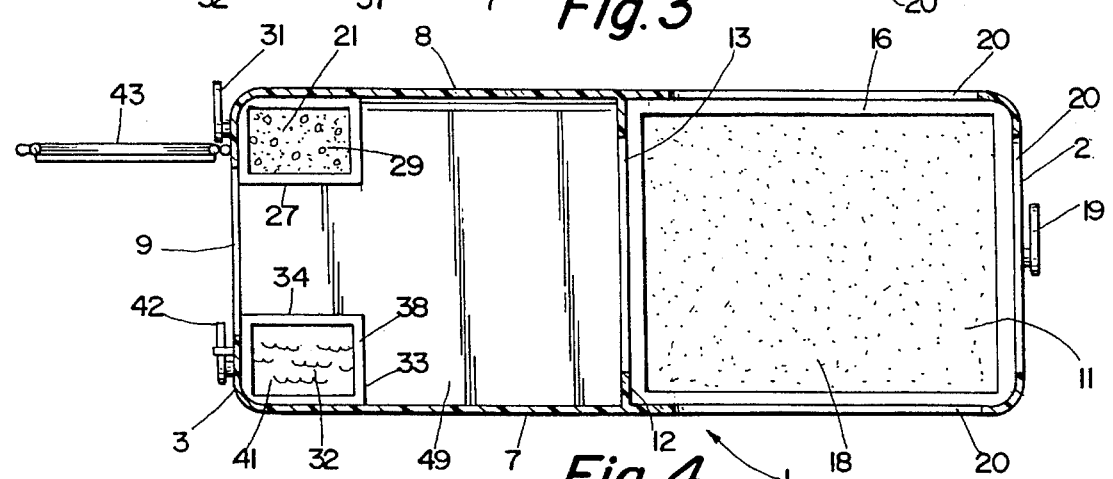
FIG. 4 is a sectional view of the first embodiment of the present invention taken along line 3—3 of FIG. 2 showing the litter door, food container door and water container door removed from the compartment.
Figures 5, 6:
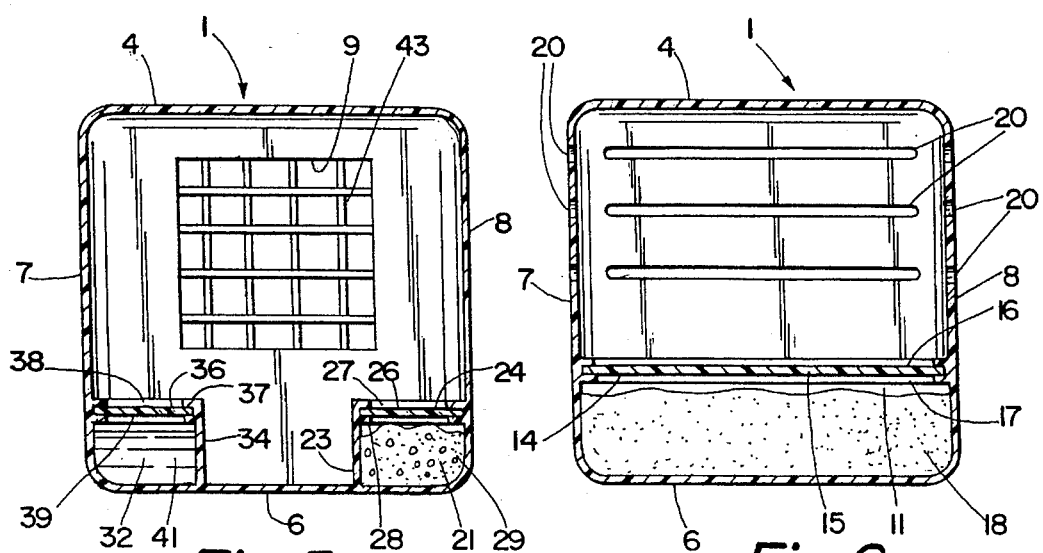
FIG. 5 is a sectional view of the first embodiment of the present invention taken along line 5—5 of FIG. 2.
FIG. 6 is a sectional view of the first embodiment of the present invention taken along line 6—6 of FIG. 2.

As shown in FIGS. 3, 4 and 5, a water container 32 is formed within the compartment 1 adjacent to the opening 9 and opposite the food container 21. The water container 32 is partially formed by the second end panel 3, the bottom panel 6 and the left panel 7. The water container 32 is further formed by a first water container panel 33 connected to the bottom panel 6 and left panel 7 in substantially parallel planar relation to the second end panel 3. The water container 32 is further formed by a second water container panel 34 connected to the first water container panel 33, the bottom panel 6 and the second end panel 3 in substantially perpendicular relation to the first water container panel 33.

A horizontal water door slot 36 is defined by the second end panel 3, adjacent to the water container 32, for receiving a water container door 37 therethrough. The water container door 37, when inserted through the water door slot 36 is slidably received between a rectangular first water container runner 38, connected to and extending along the second end panel 3, the left panel 7, the first water container panel 33 and the second water container panel 34, and a second water container runner 39, connected to and extending along the first water container panel 33, the left panel 7, the first water container panel 33 and the second water container panel 34 in parallel relation to the first water container runner 38. The first and second water container runners 38 and 39 are connected to the second end panel 3 and spaced on opposite sides of the water door slot 36.

A quantity of water 41 is contained in the water container 32 and may be selectively isolated from the interior of the compartment 1 by inserting the water container door 37 through the water door slot 36, along the first and second water container runners 38 and 39, and in abutment with the first water container panel 33. A latch 42 is rotatably connected to the left panel 7 and may be rotated across the water door slot 36 to secure the water container door 37 within the compartment 1.

A wire frame gate 43 is pivotally connected to the second end panel 3 for selectively opening and closing the opening 9. A latch 44 is connected to the gate 43 and to the second end panel 3 for securing the gate 43 in a closed position.

Two handle connectors 46 are connected to the top panel 4. A handle 47 is detachably connected to the handle connectors 46 by two clips 48 connected to the handle 47.

During manual transport or during such other times that the compartment 1 may be subjected to slipping, tipping, jolting or other external influences during travel, the litter door 15, the food container door 26 and water container door 37 will be inserted within the compartment 1 to prevent spillage. When the compartment 1 is in a stable position, the doors 15, 26 and 37 may be removed to provide the pet access to the pet food 29, water 41 and pet litter 18 provided. After the pet has utilized the pet litter 18, the litter door 15 can be reinserted within the compartment 1 to isolate the pet litter 18 and thereby contain any unpleasant odor generated by the pet's use thereof. The litter box panel 12 provides some separation between the litter box 11 and the pet's food, water and general living space 49.

A second embodiment of the present invention is shown in FIGS. 7–12, wherein the singular compartment 1 of the first embodiment is divided into a substantially cubicle litter box compartment 51 and a substantially cubicle living compartment 52. As shown in FIGS. 9, 10 and 12, the litter box compartment 51 includes the first end panel 2, the litter box 11, litter box panel 12, portal 13 and ventilation slots 20. The living compartment 52 includes the second end panel 3, the food container 21, the water container 32, and has a third end panel 53 formed opposite the second end panel 3. The litter box compartment 51 is detachably connected to the living compartment 52 by a plurality of lever and post fasteners 54 connected to the litter box compartment 51 and the living compartment 52.

The third end panel 53 defines a passage 56 which allows the pet to move to and from the living compartment 52 and litter box compartment 51. A cross-sectionally L-shaped guide 57 is connected to the third end panel 53 and extends along the left, right and bottom edges of the third end panel 53 for receiving a compartment divider 58. A divider panel slot 59 is defined by the living compartment 52, adjacent the third end panel 53, to facilitate insertion of the compartment divider 58 within the living compartment 52 and the guide 57.

As shown in FIGS. 7–9, two of the aforedescribed handle connectors 46 are connected to the living compartment 52 and two handle connectors 46 are connected to the litter box compartment 51. When the living compartment 52 and litter box compartment 51 are connected, as is shown in FIGS. 7 and 9, the handle connectors 46 are disposed in linear relation and each are spaced an equal distance from the adjacent handle connectors 46.

When the living compartment 52 is disconnected from the litter box compartment, as shown in FIG. 8, a first handle 47a having clips 48 connected thereto is detachably connected, by the clips 48, to those connectors 46 attached to the living compartment 52. A second handle 47b having clips 48 connected thereto is detachably connected to those connectors 46 attached to the litter box compartment 51.

The living compartment 52 may be connected to the litter box compartment 51, as shown in FIGS. 7 and 9, with the compartment divider 58 removed from the guide 57 to provide a combined pet carrying unit. As shown in FIGS. 7 and 9, one of the handles 47 is disconnected and the other handle is connected to the connectors 46 closest to the litter box panel 12 and third end panel 53 in order that the detachably connected compartments 51 and 52 may be easily carried as a unit. Alternatively, the compartments 51 and 52 may be disconnected with the compartment divider 58 received within the guide 57, and the handle 47a connected to the living compartment 52, as shown in FIG. 8, such that the living compartment 52 may be easily carried as a separate unit.

The second embodiment of the present invention can be used to satisfy the functions of the first embodiment of the present inventions and, additionally, allows the advantage of transporting the pet in the smaller, lighter living compartment 52. Further, the pet may be contained in the living compartment 52 with the litter box 11 distanced and completely separated from the pet's food and water. This advantage is particularly realized by owners of finicky pets which will not eat or sleep near their litter box.

While I have shown my invention in two forms, it will be obvious to those skilled in the art that it is not so limited but is susceptible of various changes and modifications without departing from the spirit thereof.

What we claim is:

1. an improved pet carrier including a substantially cubicle compartment having a bottom panel, a top panel, a left panel, a right panel, a first end panel and a second end panel and comprising:

(a) a litter box contained within said compartment and partially formed thereby for containing a quantity of pet litter;

(b) means connected to said compartment adjacent to said litter box and accessible from the exterior of said compartment for selectively sealing and unsealing said litter box; and (c) a food container integrally connect to and partially formed by said compartment opposite said litter box for containing a quantity of pet food; and (d) means connected to said compartment adjacent to said food container and accessible from the exterior of said compartment for selectively closing said food container, wherein said closing means includes:

(i) a food container door slot defined by said compartment adjacent to said food container;

(ii) a first rectangular food container runner connected to and extending along said compartment and said food container adjacent to said food container door slot;

(iii) a second food container runner connected to and extending along said compartment and said food container adjacent to said food container door slot and on an opposite side thereof from said first food container runner; and (iv) a substantially planar food container door slidably received within said food container slot and slidably engaged between said first and second food container runners, whereby said food container door may be selectively inserted within said compartment through said food container door slot and along said first and second food container runners to selectively seal said food container.

2. An improved pet carrier including a substantially cubicle compartment having a bottom panel, a top panel, a left panel, a right panel, a first end panel and a second end panel and comprising:

(a) a litter box contained within said compartment and partially formed thereby for containing a quantity of pet litter;

(b) means connected to said compartment adjacent to said litter box and accessible from the exterior of said compartment for selectively sealing and unsealing said litter box;

(c) a water container integrally connected to and partially formed by said compartment opposite said litter box for containing a quantity of water; and (d) means connected to said compartment adjacent to said water container and accessible from the exterior of said compartment, wherein said closing means includes:

(i) a water container door slot defined by said compartment adjacent to said water container;

(ii) a first rectangular water container runner connected to and extending along said compartment and said water container and adjacent to said water container door slot;

(iii) a second rectangular water container runner connected to and extending along said compartment and said water container and adjacent to said water container door slot on an opposite side thereof from said first water container runner; and (iv) a substantially planar water container door slidably received within said water container door slot and slidably engaged between said first and second water container runners, whereby said water container door may be selectively inserted within said compartment through said water container door slot and along said first and second water container runners to selectively seal said water container.

3. An improved pet carrier comprising:

(a) a substantially cubicle litter compartment having a portal defined at one end thereof and a litter box formed within said litter compartment for containing a quantity of pet litter;

(b) a substantially cubicle living compartment, having an opening defined at one end thereof and a passage defined at an opposite end thereof; and (c) a means connected to said litter box compartment and said living compartment for detachably connecting said litter box compartment in abutment with said living compartment, wherein said passage is aligned with said portal to facilitate communication between said litter box compartment and said living compartment.

4. An improved pet carrier as described in claim 3 wherein said detachable connecting means comprises a plurality of leveraged lever and post fasteners.

5. An improved pet carrier as described in claim 3 comprising means connected to said living compartment for selectively blocking said passage.

6. An improved pet carrier as described in claim 5 wherein said blocking means comprises:

(a) a cross-sectionally L-shaped guide connected to said living compartment adjacent to said passage; and (b) a compartment divider slidably received within said guide and across said passage.

7. An improved pet carrier as described in claim 3 further comprising means connected to said litter box compartment adjacent to said litter box and accessible from the exterior of said litter box compartment for selectively sealing and unsealing said litter box to selectively isolate said quantity of pet litter from the interior of said litter box compartment.

8. An improved pet carrier as described in claim 7 wherein said sealing means comprises:

(a) a litter door slot defined by said litter box compartment adjacent to said litter box;

(b) a rectangular litter box runner connected to and extending along said litter box compartment adjacent to said litter door slot;

(c) a second litter box runner connected to and extending along said litter box compartment adjacent to said litter door slot on an opposite side thereof from said first litter box runner; and (d) a substantially planar litter door slidably received within said litter door slot and slidably engaged between said first and second litter box runners, whereby said litter door may be selectively inserted within said litter box compartment through said litter door slot and along said first and second litter box runners to selectively seal said litter box.

9. An improved pet carrier as described in claim 8 further comprising a litter box panel connected to said litter box compartment, forming an end thereof, and to said first and second pairs of runners, such that said litter door, when fully inserted within said litter door slot and along said first and second litter box runners, will abut said litter panel to isolate said quantity of pet litter within said litter box.

10. An improved pet carrier as described in claim 3 further comprising:

(a) a food container integrally connected to and partially formed by said living compartment for containing a quantity of pet food; and (b) means connected to said living compartment adjacent to said food container and accessible from the exterior of said living compartment for selectively closing said food container to selectively isolate said quantity of pet food within said food container.

11. An improved pet carrier as described in claim 10 wherein said closing means comprises:

(a) a food container door slot defined by said living compartment adjacent to said food container;

(b) a first rectangular food container runner connected to and extending along said food container adjacent to said food container door slot;

(c) a second rectangular food container runner connected to and extending along said food container adjacent to said food container door slot on an opposite side thereof from said first food container runner; and (d) a substantially planar food container door slidably received within said litter door slot and slidably engaged between said first and second pairs of food container runners, whereby said food container door may be selectively inserted within said living compartment through said food container door slot and along said first and second food container runners to selectively seal said food container.

12. An improved pet carrier as described in claim 3 further comprising:

(a) a plurality of handle connectors connected to said litter box compartment and said living compartment; and (b) a pair of handles detachably connected to said handle connectors such that one handle may be detachably connected to said litter box compartment and another handle connected to said living compartment or one handle may be detachably connected to both said living compartment and said litter box compartment.

13. An improved pet carrier as described in claim 3 wherein said handle connectors are disposed in linear relation and are spaced an equal distance apart when said living compartment is detachably connected to said litter box compartment.

* * * * *